Figures 1, 2:
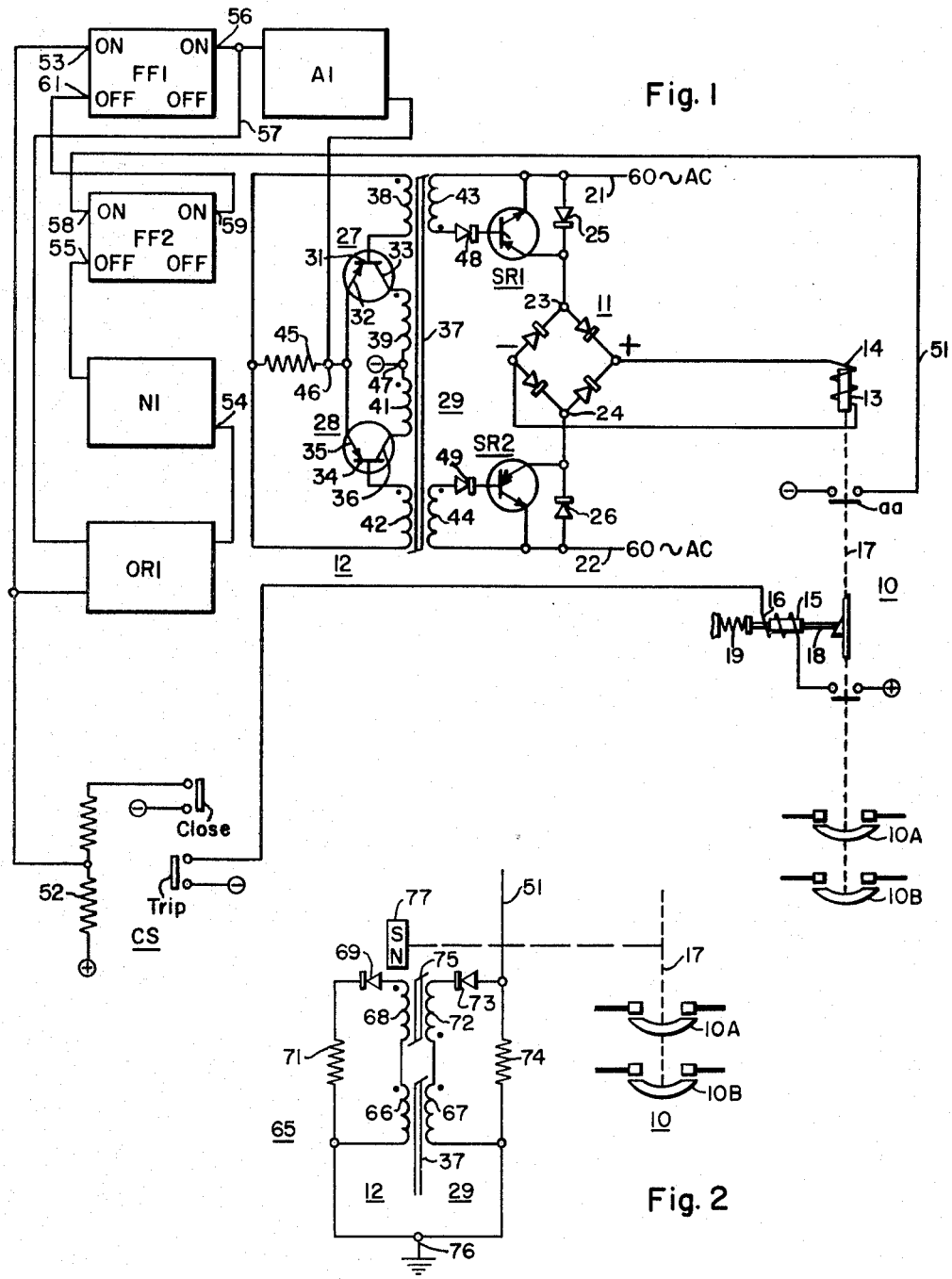

May 31, 1966 S. D. SILLIMAN 3,254,271

CIRCUIT BREAKER CONTROL SYSTEM

Filed Oct. 16, 1962

WITNESSES
John L. Chopp
James F. Young

INVENTOR
Sheldon D. Silliman
BY
Clement L. McHale
ATTORNEY

United States Patent Office 3,254,271
Patented May 31, 1966

3,254,271
CIRCUIT BREAKER CONTROL SYSTEM
Sheldon D. Silliman, Forest Hills, Pa., assignor to Westinghouse Electric Corporation, Pittsburgh, Pa., a corporation of Pennsylvania
Filed Oct. 16, 1962, Ser. No. 230,977
7 Claims. (Cl. 317—148.5)

This invention relates, generally to circuit breaker control systems and, more particularly, to breaker control systems utilizing static devices as control elements.

In Patent No. 2,845,583, issued July 29, 1958, to J. F. Reuther and S. D. Silliman, there is described a circuit breaker control system utilizing semiconductor devices, such as transistors, as control elements.

An object of this invention is to utilize silicon controlled rectifiers as control elements in circuit breaker control systems.

Another object of this invention is to provide a static control system capable of controlling the operation of circuit breakers requiring relatively large amounts of current to perform the closing operation.

A further object of the invention is to utilize static devices to prevent pumping in a circuit breaker control system.

Still another object of the invention is to utilize silicon controlled rectifiers in an alternating current controlled, direct current operated circuit breaker closing system.

Other objects of the invention will be explained fully hereinafter or will be apparent to those skilled in the art.

In accordance with one embodiment of the invention, the closing coil of a circuit breaker which requires a relatively large amount of D.-C. current is energized from an A.-C. source through a full wave rectifier. The flow of A.-C. current to the rectifier is controlled by silicon controlled rectifiers which are, in turn, controlled by a D.-C. to A.-C. inverter. The inverter is switched on by a FLIP-FLOP which is turned on by a control switch or a computer. A second FLIP-FLOP controlled by operation of the breaker turns the first FLIP-FLOP off when the breaker closes. The second FLIP-FLOP is turned off by a signal from the first FLIP-FLOP to return the system to a normally deenergized condition.

As used herein, the term FLIP-FLOP or memory circuit refers to a circuit element which is stable in either of two states. It will remain in one state until pulsed to switch to the other state.

A silicon controlled rectifier is a semiconductor device which has a high resistance to the flow of current until voltage is applied between the gate and the cathode to unblock the rectifier and allow current to flow through the rectifier in the forward direction. Once the rectifier becomes conducting, the forward current continues to flow until interrupted by external means.

An OR circuit is a circuit element which provides an output signal in response to any one of a number of input signals.

A NOT circuit is a circuit element which provides an output signal only so long as no input signal is applied.

A NOR circuit is a circuit element which has an output only if all input signals are zero.

For a better understanding of the nature and objects of the invention, reference may be had to the following detailed description, taken in conjunction with the accompanying drawing, in which:

FIGURE 1 is a diagrammatic view of a circuit breaker control system embodying the principal features of the invention; and FIG. 2 is a detail view of a modification of one of the features shown in FIG. 1.

Referring now to the drawing, and particularly to FIG. 1, the system shown therein comprises a circuit breaker 10, a full-wave rectifier 11, a pair of silicon controlled rectifiers SR1 and SR2, a direct-current to alternating current inverter 12, two FLIP-FLOP circuit elements FF1 and FF2, an amplifier circuit element A1, a NOT circuit element N1, an OR circuit element OR1 and a manually operable control swicth CS.

The circuit breaker 10 is provided with a closing solenoid, comprising an armature 13 and a coil 14, and a tripping solenoid comprising an armature 15 and a coil 16. When the closing coil 14 is energized the armature 13 is actuated to close contact members 10A and 10B of the breaker by raising a lift rod 17 of the breaker mechanism.

The contact members of the breaker are held closed by a latch 18 which is biased by a spring 19. When the tripping coil 16 is energized the armature 15 is actuated to release the latch 18. It will be understood that closing mechanisms and tripping mechanisms of other types well known in the art may be utilized if desired.

The closing solenoids for large circuit breakers require a relatively large amount of electrical energy. Furthermore, circuit breakers of certain types have D.-C. operated closing mechanisms. In order to take advantage of the fact that alternating current is easier to interrupt than direct current, the full-wave rectifier 11 is provided to convert alternating current supplied through conductors 21 and 22 to direct current for energizing the closing coil 14.

In order to control the flow of current to the rectifier 11 the silicon controlled rectifiers SR1 and SR2 are provided. The rectifier SR1 is connected between the conductor 21 and an input terminal 23 of the bridge rectifier 11. The rectifier SR2 is connected between the conductor 22 and the other input terminal 24 of the bridge rectifier 11. A rectifying diode 25 is connected in parallel circuit relation to the rectifier SR1. The diode 25 is poled oppositely to the rectifier SR1. Likewise, a rectifying diode 26 is connected parallel to and poled oppositely to the rectifier SR2.

As explained hereinbefore, each one of the silicon controlled rectifiers has a high resistance to the flow of current until voltage is applied between the gate and the cathode to unblock the rectifier and allow current to flow through the rectifier in the forward direction. The current continues to flow until interrupted by external means. On A.-C. alternating current, each current zero will cause the rectifier to block. Thus, means must be provided to gate the controlled rectifiers alternately each half cycle the closing coil 14 is to be energized.

In order to control the operation of the rectifiers SR1 and SR2 in the foregoing manner, the D.-C. to A.-C. inverter 12 is provided. The inverter generates voltages of higher frequency than 60 cycles, for example 1000 cycles. It may be of the type fully described in Patent No. 2,783,384, issued February 26, 1957, to R. L. Bright and G. H. Royer. As shown, the inverter 12 comprises a pair of transistor switching devices 27 and 28, and a saturable magnetic core means 29.

The transistors 27 and 28 are preferably of the p-n-p junction type with the transistor 27 having a base 31, an emitter 32 and a collector 33. Likewise, the transistor 28 has a base 34, an emitter 35 and a collector 36. The core means 29 includes a magnetic core 37 and a plurality of windings 38, 39, 41, 42, 43 and 44 which are inductively disposed on the core 37. Preferably, the core 37 is composed of a material having a substantially rectangular hysteresis loop.

As shown, one terminal of the winding 38 is connected to the base 31 of the transistor 27. The other terminal of the winding 38 is connected through a resistor 45 to a point 46 which is common to the emitters 32 and 35 of the transistors 27 and 28, respectively. One terminal of the winding 42 is connected to the base 34 of the transistor 28 and the other terminal is connected to the common point 46 through the resistor 45. The windings 39 and 41 constitute together a single winding having a center tap 47 which is connected to a negative potential. The outside terminal of the winding 39 is connected to the collector 33 of the transistor 27. The outside terminal of winding 41 is connected to the collector 36 of the transistor 28. One terminal of the winding 43 is connected to the A.-C. conductor 21, and the other terminal is connected to the gate of the rectifier SR1 through a rectifying diode 48. One terminal of the winding 44 is connected to the A.-C. conductor 22 and the other terminal is connected to the gate of the rectifier SR2 through a rectifying diode 49.

As explained in the aforesaid Patent No. 2,783,384, when positive potential is applied to the point 46 the transistors 27 and 28 are alternately made conductive and nonconductive to induce two voltage pulses of opposite polarity in the windings 43 and 44 for each complete cycle of operation of the inverter circuit to thereby provide an alternating voltage output. The period of each half cycle of the A.-C. voltage is proportional to the time required for the core 37 to become magnetically saturated after each reversal of the conducting conditions of the transistors 27 and 28. Thus, the inverter may be constructed to have a relatively high frequency output.

As described in the aforesaid Patent No. 2,845,583, the application of a signal voltage to the inverter 12 to close the breaker 10 may be effected by means of the amplifier A1 under the control of the FLIP-FLOP FF1 which, in turn, may be controlled by the control switch CS or by any other suitable means, such as a computer. The second FLIP-FLOP FF2, which is triggered through a conductor 51 by means of contact aa on the mechanism of the circuit breaker 10, turns the FILP-FLOP FF1 off when the breaker closes. An output signal from the FLIP-FLOP FF1 then turns the FLIP-FLOP FF2 off, thereby returning the system to a deenergized condition.

When a signal voltage is established at the point 46 in the foregoing manner the inverter 12 is switched on to generate high frequency voltages in the windings 43 and 44. The high frequency signals control the rectifiers SR1 and SR2. When the upper A.-C. bus 21 is positive with respect to the lower bus 22, current flows through the diode 25, the bridge rectifier 11, the closing coil 14 and the rectifier SR2, which is gated by the high frequency output of winding 44, to the lower A.-C. bus 22. On the alternate half cycle, current flows through the diode 26, the bridge rectifier 11, the closing coil 14 and the rectifier SR1, which is gated by the high frequency output of winding 43, to the upper A.-C. bus 21. When the signal voltage is removed from the inverter 12 it stops and both of the silicon controlled rectifiers SR1 and SR2 block the flow of current since they are no longer gated by the inverter of each half cycle.

When the breaker 10 closes the FLIP-FLOPS are turned off to remove the signal from the inverter 12. Tripping of the circuit breaker may be effected by operating the control switch CS to close the "Trip" contact, thereby energizing the tripping coil 16.

In order to prevent pumping of the circuit breaker 10 as a result of the mechanism failing to latch in the closed position, the OR circuit element OR1 and the NOT circuit element N1 are provided. When the control switch CS is operated to the "close" position, a voltage divider 52 is energized. This applies a signal voltage through OR circuit element OR1 to NOT circuit element N1 and also to "on" terminal 53 of FILP-FLOP FF1. The application of a signal to terminal 54 of NOT circuit element N1 removes a signal from "off" terminal 55 of FLIP-FLOP FF2. At the same time, FLIP-FLOP FF1 is turned on and produces an output signal at terminal 56. This signal is applied to the amplifier A1 to effect energization of the closing coil 14 in the manner previously described. At the same time, the output signal from FLIP-FLOP FF1 is applied through conductor 57 to OR circuit element OR1 and thence to NOT circuit element N1, thereby maintaining NOT circuit element N1 in the "off" condition.

Closing of the breaker 10 applies a signal through contact member aa and conductor 51 to an input terminal 58 of FLIP-FLOP FF2 turning it "on." This produces an "on" output signal at terminal 59 which signal is applied to "off" input terminal 61 of FLIP-FLOP FF1 turning it off, and removing the input signal from the amplifier A1 to effect deenergization of the closing coil 14. Removal of the "on" output signal of FLIP-FLOP FF1 and the signal from the switch CS removes the input to NOT element N1 and results in an output signal which turns FLIP-FLOP FF2 off. Thus, it is necessary to return the switch CS to the "off" position and then reclose the switch in order to repeat the foregoing sequence of operation to again energize the closing coil 14. In this manner pumping of the breaker is prevented.

It will be understood that a NOR circuit element may be utilized in place of the OR and the NOT elements if desired. It will also be understood that the bridge rectifier 11 may be omitted if the breaker is provided with a closing coil which may be energized directly with alternating current in place of direct current.

If desired, a saturable reactor or amplifier 65, shown in FIG. 2, may be utilized in place of the auxiliary switch aa to apply a signal to FLIP-FLOP FF2 through conductor 51 when the breaker 10 closes. Two additional windings 66 and 67 are disposed on the core 37 of the inverter 12. The winding 66 is connected in series circuit relation with a winding 68, a diode 69 and a resistor 71. The winding 67 is connected in series circuit relation with a winding 72, a diode 73 and a resistor 74. The windings 68 and 72 are disposed on a saturable core 75. A point 76, which is common to the windings 66 and 67 and the resistors 71 and 74, is connected to the ground. The voltage derived from the coils on the inverter is utilized to operate the reactor. Normally there is no output signal from the reactor because of the resetting action of the windings 66 and 68. When the breaker closes, a permanent magnet 77 is mechanically positioned to saturate the core 75, and block the resetting action thereby applying an output signal on conductor 51 to cause the deenergization of the closing coil 14 in the manner hereinbefore described.

From the foregoing description, it is apparent that the invention provides for utilizing static switching devices, such as silicon controlled rectifiers, to control the energization of an operating coil for a circuit breaker or other apparatus. The present system is particularly suitable for controlling the operation of relatively large circuit breakers which require relatively high currents to operate their closing mechanisms.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a circuit breaker having a closing coil, conductors energized from an alternating-current source to supply energy to the closing coil, silicon controlled rectifiers for controlling the energization of the closing coil from said source, a direct-current to alternating-current inverter connected in circuit relation with said rectifiers for controlling the operation of the silicon controlled rectifiers, control means connected in circuit relation with the inverter for controlling the operation of the inverter to actuate said rectifiers to energize said coil from said source, and means and connected in circuit relation with the control means and actuated by the closing of the circuit breaker to cause the control means to actuate the inverter and the controlled rectifiers to deenergize the closing coil.

2. In a control system, in combination, a circuit breaker having a closing coil, conductors energized from an alternating-current source of a predetermined frequency to supply energy to the closing coil, silicon controlled rectifiers for controlling the energization of the closing coil from said source, a direct-current to alternating-current inverter for generating a voltage of a higher frequency than that of said source and for controlling the operation of the silicon controlled rectifiers, a plurality of control devices for controlling the operation of the inverter, control means for controlling the energization of the control devices, and means connected in circuit relation with the control devices and actuated by the closing of the circuit breaker to cause the control devices to actuate the inverter and the silicon controlled rectifiers to deenergize the closing coil.

3. In a control system, in combination, a circuit breaker having a closing coil, conductors energized from an alternating-current source to supply energy to the closing coil from a source of alternating current of a predetermined frequency, a full-wave rectifier for converting the alternating current to direct current, a pair of silicon controlled rectifiers connected in circuit relation with said full wave rectifier for controlling the energization of the full-wave rectifier, a direct-current to alternating-current inverter connected in circuit relation with said controlled rectifiers for generating a voltage of higher frequency than that of said source and controlling the operation of the silicon controlled rectifiers, control means connected in circuit relation with the inverter for controlling the operation of the inverter to actuate said controlled rectifiers to energize said coil from said source, and means connected in circuit relation with the control means and actuated by the closing of the circuit breaker to cause the control means to actuate the inverter and the controlled rectifiers to deenergize the closing coil.

4. Control apparatus comprising, a pair of silicon controlled rectifiers for controlling the energization of an operating coil of a device from a source of alternating current of a predetermined frequency, a direct-current to alternating-current inverter connected in circuit relation with said source for generating a voltage of higher frequency than that of said source and controlling the operation of the silicon controlled rectifiers, a plurality of FLIP-FLOP elements for controlling the operation of the inverter, control means for controlling the energization of the FLIP-FLOPS, additional control means actuated by the device, and static means cooperating with said additional control means to control the deenergization of the FLIP-FLOPS.

5. Control apparatus comprising, a pair of silicon controlled rectifiers for controlling the energization of an operating coil of a device from a source of alternating current of a predetermined frequency, a direct-current to alternating-current inverter connected in circuit relation with said controlled rectifiers for generating a voltage of higher frequency than that of said source and controlling the operation of the silicon controlled rectifiers, a plurality of FLIP-FLOP elements connected in circuit relation with said inverter for controlling the operation of the inverter, control means connected in circuit relation with said FLIP-FLOP elements for controlling the energization of the FLIP-FLOPS and saturable reactance means energized by the inverter and controlled by the device for controlling the deenergization of the FLIP-FLOPS.

6. A control system for controlling the energization of a closing coil of a circuit breaker having auxiliary contacts comprising silicon controlled rectifier means for controlling the energization of said closing coil from a source of alternating current, inverter means for actuating said rectifier means to energize said closing coil from said source, a first FLIP-FLOP element for controlling said inverter means, a second FLIP-FLOP element for controlling said first FLIP-FLOP element, control means including a control switch for controlling said first FLIP-FLOP element, an OR element and a NOT element connected in circuit relation with said control switch for controlling said second FLIP-FLOP element, said auxiliary contacts being connected in circuit relation with said second FLIP-FLOP element for independently controlling said second FLIP-FLOP element to restore said first and second FLIP-FLOP elements to predetermined operating conditions when said closing coil is energized and said circuit breaker is actuated to the closed position.

7. A control system for controlling the energization of a closing coil of a circuit breaker comprising silicon controlled rectifier means for controlling the energization of said closing coil from a source of alternating current, inverter means for actuating said rectifier means to energize said closing coil from said source, a first FLIP-FLOP element for controlling said inverter means, a second FLIP-FLOP element for controlling said first FLIP-FLOP element, control means including a control switch for controlling said first FLIP-FLOP element, an OR element and a NOT element connected in circuit relation with said control switch for controlling said second FLIP-FLOP element, and saturable reactance means energized by said inverter means and actuated by the closing of said circuit breaker for independently controlling said second FLIP-FLOP element to restore said first and second FLIP-FLOP elements to predetermined operating conditions after said closing coil is energized.

References Cited by the Examiner

UNITED STATES PATENTS 2,909,707   10/1959   Derr et al. _____ 317—54 X
3,107,324   10/1963   Wright et al. _____ 321—16

SAMUEL BERNSTEIN, *Primary Examiner.*

L. T. HIX, *Assistant Examiner.*